Patented Nov. 26, 1935

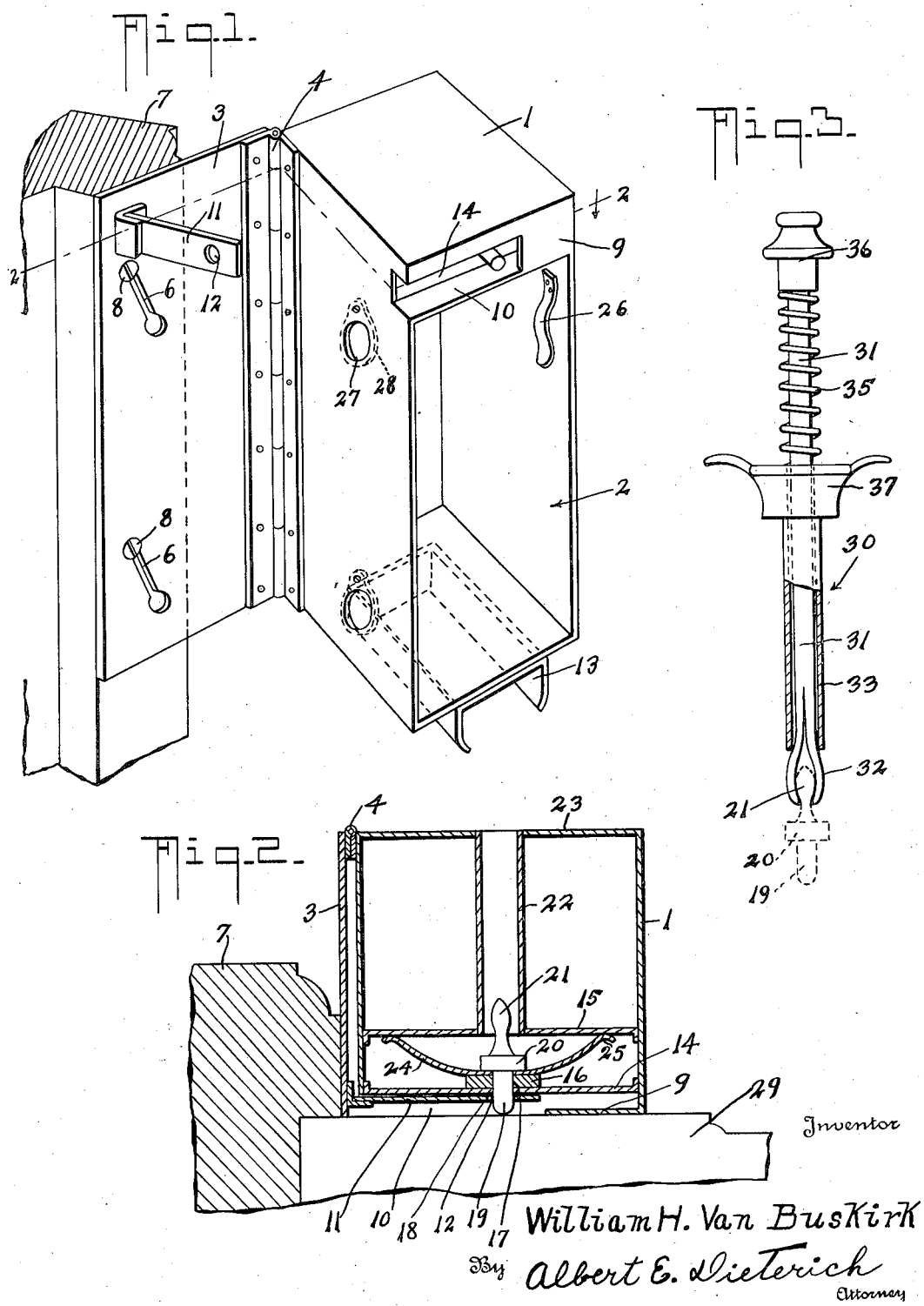

2,022,226

UNITED STATES PATENT OFFICE 2,022,226

SAFETY MILK BOTTLE CONTAINER

William Harold Van Buskirk, Vancouver, British Columbia, Canada, assignor of one-half to Oliver Beaulieu, Vancouver, British Columbia, Canada Application March 22, 1933, Serial No. 662,037

6 Claims. (Cl. 232—42)

The invention relates to certain new and useful improvements in containers for milk bottles, and it particularly has for its object to provide a safe means to hold the bottles against unauthorized removal and in an elevated position out of reach of animals.

Further, it is an object to provide a safety milk bottle container having provisions for ventilation if desired.

Further, it is an object to provide a milk bottle container which cannot be opened by an ordinary key but which requires a special tool (hereinafter called a grapple-key) to be provided for opening the container from the outside.

Again, it is an object to provide a container having an open side which, when the container is locked, faces the door of the building and lies close thereto in order that the door of the building to which the receptacle is attached may serve as a closure for the receptacle.

Further, it is an object to provide a milk bottle container of a simple and inexpensive construction which will readily and effectively serve its intended purpose.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Figure 1 is a perspective view of the invention, the receptacle being shown unlocked and ready to receive the milk bottles.

Figure 2 is a horizontal section on substantially the line 2—2 of Figure 1 with the receptacle in the locked position, the view being on an enlarged scale.

Figure 3 is an elevation, parts being broken away, of the grapple "key" or gripping means used to unlock the receptacle.

In the drawing, in which like numerals of reference indicate like parts in all the figures, 1 represents the receptacle which has an open front side 2. The receptacle is hinged at 4 to a mounting plate 3, the latter having key-hole slots 6 to receive the screw 8 by which the device is mounted on the side of a door jamb 7 so as to hold the open face 2 of the receptacle flush against the door 29, as indicated in Figure 2.

The open side of the receptacle 1 is provided with a lip 9 and a recess 10, the recess being adapted to receive a locking strap or tongue 11 which is secured to the plate 3 and which has a hole 12 to receive the bolt 19 of the latching plunger.

The container 1 is provided with locking means, comprising the two partitions 14 and 15 spaced from one another and extending from side to side of the container, the partition 14 being set in from the open face of the container and constituting a back wall for the recess 10.

The partition 14 is provided intermediate its length with a block 16 that has an orifice 17 therethrough, the orifice 17 communicating with an orifice 18 in the partition 14. A plunger bolt 19 is positioned within the orifices 17 and 18 and is provided with a boss 20 and a beveled head 21. The head 21 extends into a barrel 22 which is positioned between the wall 15 of the container and the back wall 23 of the container intermediate the side walls.

24 indicates a leaf spring of bow shape which is secured to the boss 20 and has its ends 25 in sliding contact with the partition 15, the spring normally holding the plunger bolt in the extended position (see Figure 2). 26 designates a ticket retaining clip which is provided in the container adjacent the open side thereof.

In order to ventilate the container the wall thereof which is adjacent the mounting plate 3 is provided with upper and lower openings 27 covered by dampers 28 by means of which the area of the openings may be regulated.

In order to release the bolt 19 from the locking strap or tongue 11 I provide what I term a grapple "key", shown in detail in Figure 3. The "key" 30 consists of an inner barrel or rod 31 having a bifurcated end 32, the rod 31 passing through an outer barrel or sleeve 33 and being provided with a head 36. The outer barrel or sleeve 33 is also provided with a head 37 and a coil spring 35 is located between the heads 36 and 37 in order constantly to tend to separate those heads and consequently to draw the bifurcated end 32 into the barrel 33 to cause the bifurcated end to grip the beveled head 21 when the "key" is in engagement with the same (see dotted lines in Figure 3). In order to apply the "key" to unlock the receptacle the operator places the head 36 in the palm of his hand and pulls the head 37 toward it by using his fingers, thus projecting the bifurcated or split end 32 of the inner barrel or rod 31 outwardly. In this position the tool is inserted into the barrel 22 and the bifurcated ends 32 are pushed over the head 21 of the plunger bolt, whereupon the operator releases the head 37 to permit the spring 35 to cause the barrel 33 to squeeze the bifurcated end 32 and thereby lock it to the beveled head 21. By then pulling on the head 36 the plunger 19 can be withdrawn against the tension of the spring 24 to disengage the locking strap or tongue 11.

When the container is open, as shown in Figure 1, a milk bottle may be placed inside the same, and in order that a second bottle may be carried safely I provide a retaining element 13 on the bottom of the container 1, this element 13 being closed on three sides, the open side thereof being in alignment with the open side of the container so that when the container is in the closed position the open side of the retaining element 13 will be closed by the door 29, also. The member 13 is so formed as to constitute a slideway into which the neck ring of the bottle may be slid and serves to hang the lower or second bottle from the container 1.

When the housewife desires to remove the milk bottle all she needs to do is to open the door 29, which consequently exposes the side of the container 1 and the retaining element 13. Having removed the full bottle, or bottles, from the container she then places empty bottles in the same and closes the door again. When the milk-man comes around he opens the container with the grapple "key", as before described, removes the empty bottles and the ticket which has been placed under the clip by the housewife, and places the full bottles in position. After that he moves the container 1 to the closed position and locks the same.

While I have described the invention as especially designed for holding milk bottles, it is obvious that bread or other vended articles may be held in the container if desired. It is obvious that the lock is of such a type that it cannot be picked, but requires the use of the special type of "key" as shown in Figure 3, and as only authorized employees would hold such "keys" it is obvious that the invention serves as an effective means to prevent theft of milk bottles, as well as to keep them up out of reach of animals that might be prowling around.

From the foregoing description, taken in connection with the accompanying drawing, it is thought that the complete construction, operation and advantages of the invention will be clear to those skilled in the art to which it appertains.

What I claim is:

1. In a milk bottle container, a support, a box having an open side movably mounted on said support to be movable from an open to a closed position, means to lock the box in the closed position, said means comprising a spring-pressed plunger, a tube in the box into which an end of the plunger projects, the tube opening through a closed side of the box, a fixed member to receive said plunger to hold the box locked, said tube being formed to receive a gripping means to engage said end of said plunger for releasing the plunger from said fixed member.

2. In a milk bottle container, a support, a box having an open side movably mounted on said support to be movable from an open to a closed position, means to lock the box in the closed position, said means comprising a spring-pressed plunger, a tube in the box into which an end of the plunger projects, the tube opening through a closed side of the box, a fixed member to receive said plunger to hold the box locked, said tube being formed to receive a gripping means to engage said end of said plunger for releasing the plunger from said fixed member, said box having a recess to receive said fixed member when the box is in the closed position.

3. In a milk bottle holder, a box having side walls, a top wall, a bottom wall, a front wall, and a shallow wall at the back of the box having a transverse recess open across the back of the box, the major part of the back of the box having no wall, a lock device including a latch bolt projecting into said recess, a support including a plate hinged at one side to the box adjacent the juncture of the front wall and one side wall of the box, a locking tongue carried by said support to enter said recess and be engaged by said latch bolt when the box is in the closed position, and means to secure said support to the frame of a doorway in a position whereby the open side of the box will face the plane of the door when the box is in the closed position.

4. In a milk bottle holder, a box having side walls, a top wall, a bottom wall, a front wall, and a shallow wall at the back of the box having a transverse recess open across the back of the box, the major part of the back of the box having no wall, a lock device including a latch bolt projecting into said recess, a support including a plate hinged at one side to the box adjacent the juncture of the front wall and one side wall of the box, a locking tongue carried by said support to enter said recess and be engaged by said latch bolt when the box is in the closed position, means to secure said support to the frame of a doorway in a position whereby the open side of the box will face the plane of the door when the box is in the closed position, and an auxiliary bottle holding device on the outside of the bottom of the box and having an open end at the back and a closed end at the front, the open end being approximately flush with the back of the box whereby when the box is closed the auxiliary device will be held against the removal of the bottle supported thereby.

5. In a milk bottle holder, a box having side walls, a top wall, a bottom wall, a front wall, and a shallow wall at the back of the box having a transverse recess open across the back of the box, the major part of the back of the box having no wall, a lock device including a latch bolt projecting into said recess, a support including a plate hinged at one side to the box adjacent the juncture of the front wall and one side wall of the box, a locking tongue carried by said support to enter said recess and be engaged by said latch bolt when the box is in the closed position, and means to secure said support to the frame of a doorway in a position whereby the open side of the box will face the plane of the door when the box is in the closed position, said locking device comprising a tube held within the box, said front and back walls having apertures registering with the respective ends of the tube, said latch bolt being held in said tube and comprising a locking end, spring means normally holding said locking end projected into said recess, said bolt also including a head and a neck located within the tube and accessible through the front wall aperture of the box by a gripping means for withdrawing the bolt.

6. In a milk bottle holder, a box having side walls, a top wall, a bottom wall, a front wall, and a shallow wall at the back of the box having a transverse recess open across the back of the box, the major part of the back of the box having no wall, a lock device including a latch bolt projecting into said recess, a support including a plate hinged at one side to the box, and a locking tongue carried by said support to enter said recess and be engaged by said latch bolt when the box is in the closed position.

WILLIAM HAROLD VAN BUSKIRK.